United States Patent [19]

Kwon

[11] Patent Number: 5,369,249
[45] Date of Patent: Nov. 29, 1994

[54] INDUCTOR ARRANGEMENT FOR AN INDUCTION HEATING APPARATUS

[75] Inventor: Kyung A. Kwon, Seoul, Rep. of Korea

[73] Assignee: Gold Star Co., Ltd., Seoul, Rep. of Korea

[21] Appl. No.: 926,437

[22] Filed: Aug. 10, 1992

[30] Foreign Application Priority Data

Aug. 8, 1991 [KR] Rep. of Korea ............ 91-13724

[51] Int. Cl.$^5$ .............................................. H05B 6/44
[52] U.S. Cl. ............................. 219/624; 219/675; 336/232
[58] Field of Search ............ 219/10.493, 10.67, 10.79, 219/10.75, 624, 675; 336/232, 221

[56] References Cited

U.S. PATENT DOCUMENTS

| | | | |
|---|---|---|---|
| 3,704,357 | 11/1972 | Moulin | 219/10.79 |
| 3,736,543 | 5/1973 | Lademann et al. | 336/232 |
| 3,790,735 | 2/1974 | Peters, Jr. | 219/10.493 |
| 3,843,837 | 10/1974 | Cunningham | 219/10.493 |
| 3,980,858 | 9/1976 | Hibino | 219/10.79 |
| 4,313,151 | 1/1982 | Vranken | 336/232 |
| 4,430,543 | 2/1984 | Olofsson | 219/10.79 |
| 4,613,843 | 9/1986 | Esper et al. | 336/232 |
| 4,629,843 | 12/1986 | Kato et al. | 219/10.493 |
| 4,999,597 | 3/1991 | Gaynor | 336/232 |

*Primary Examiner*—Philip H. Leung
*Attorney, Agent, or Firm*—Pennie & Edmonds

[57] ABSTRACT

A heating apparatus for an electromagnetic cooker and the manufacturing method has an improved electromagnetic induction characteristic and its capacity can be easily changed. The heating apparatus comprises a substrate made of an insulating material, a plurality of conductive fine lines formed in a spiral shape on the substrate and having a uniform thickness and width, and a pair of electrode terminals formed on the both ends of the plurality of fine lines, with for supplying a power source.

11 Claims, 5 Drawing Sheets

INDUCTOR ARRANGEMENT FOR AN INDUCTION HEATING APPARATUS

BACKGROUND OF THE INVENTION

The present invention relates to an electromagnetic induction type cooker, and more particularly to a heating apparatus for an electromagnetic cooker having the improved electromagnetic induction characteristic and also manufacturing method thereof.

A general electromagnetic induction type cooker generates an eddy current in a metallic container which holds food to be cooked and cooks the food by heating the metallic container by the generated eddy current. As shown in FIG. 1, the conventional electromagnetic cooker comprises a heating apparatus 10 having a working coil 11 and ferrite core 12. One end of the working coil 11 is connected to the collector of a transistor $Q_1$. The emitter of the transistor $Q_1$ is connected to a grounded potential GND. The transistor $Q_1$ is turned on/off by a pulse signal supplied from a comparator or an oscillator to its base, thereby opening/closing the current passage of the working coil 1. The pulse signal has a high frequency over 20 KHz. At this time, the working coil 11 generates an AC magnetic field having a high frequency and supplies it to a container 10 disposed on the ceramic plate 15. An eddy current is generated by the AC magnetic field of the high frequency in the container, which then is heated by the eddy current. The electromagnetic cooker additionally comprises a capacitor $C_2$ connected to both ends of the working coil 11, a diode $D_1$ connected between one end of the working coil 11 and the grounded potential GND, and a capacitor C connected between the other end of the working coil 11 and the grounded potential GND. The diode $D_1$ functions to protect the transistor $Q_1$, and the capacitor $C_2$ functions to remove the impulse noise generated when the transistor $Q_1$ is switched. The capacitor $C_2$ determines the frequency of pulse signal which will be supplied to the base of the transistor $Q_1$, when a comparator is connected to the base of transistor $Q_1$. At this time, the comparator compares the both-end voltages of the working coil 11 and supplies the comparing signal to the base of transistor $Q_1$ as a switching pulse signal.

FIGS. 2 and 3 are a plan view and cross-sectional view of the heating apparatus 10 shown in FIG. 1. Referring to FIGS. 2 and 3, the heating apparatus 10 comprises a mounting plate 13 on whose upper surface six ferrite cores 12 are installed. A passing hole 13-1 is formed on the central portion of the mounting base 13. The working coil 11 which is wound in the form of spiral is installed on the ferrite cores 12. A pair of power source terminals 14 for being supplied with a power source are formed on the both ends of the working coil 11.

FIG. 4 is an enlarged view of the part A of the working coil 11 shown in FIG. 2. Referring to FIG. 4, the working coil 11 having a plurality of fine lines 110 is shown. The reason for forming the working coil 11 with the plurality of fine lines 110 is to reduce a loss by a conductor skin depth effect;

$$L_S = \frac{1}{(6\pi\mu f)^{\frac{1}{2}}}$$

according to the high speed switching of the working coil. Here, $L_s$ is a penetration depth. The fine lines 110 have a small diameter of approximately 0.2 to 0.4 mm, and are coated with enamel. The fine lines 110 are formed of a conductive material having a small D.C. resistance in order to minimize the loss due to the generation of joule heat and maximize the generation efficiency of high frequency AC magnetic field.

As described above, in the conventional heating apparatus comprising a working coil composed of a plurality of fine lines, there are problems in that the magnetic field distribution is not uniform and the change of inductance of the working coil is difficult. Specifically, the conventional heating apparatus has a problem in that the distribution of the generated magnetic field is not uniform due to difference in the length winding rates of the fine lines. Also, when the distribution of the winding working coil is changed to vary the inductance of the heating apparatus, the change in the metal mold is also followed, thereby increasing the production cost.

SUMMARY OF THE INVENTION

Accordingly, it is an object of the present invention to provide a heating apparatus for an electromagnetic cooker, which can generate an AC magnetic field having a uniform distribution and whose inductance can be easily changed.

It is another object of the present invention to provide a method of manufacturing the heating apparatus.

The heating apparatus for an electromagnetic cooker of the present invention comprises a substrate formed of insulating material, a plurality of fine lines made of conductive material and formed in a spiral shape on the substrate, and a pair of connecting terminals formed on the substrate, for commonly connecting both ends of the plurality of fine lines.

The present method of manufacturing the heating apparatus for an electromagnetic cooker is achieved by providing a substrate made of insulating material and forming a plurality of fine lines made of conductive material into spiral shape on the substrate. A pair of connecting terminals are formed on the substrate, for commonly connecting both ends of the fine lines.

BRIEF DESCRIPTIONS OF THE DRAWINGS

The above objects and other advantages of the present invention will be more apparent by describing the preferred embodiments of the present invention with reference to the attached drawings, in which.

DETAILED DESCRIPTION OF THE INVENTION

Figure 5:
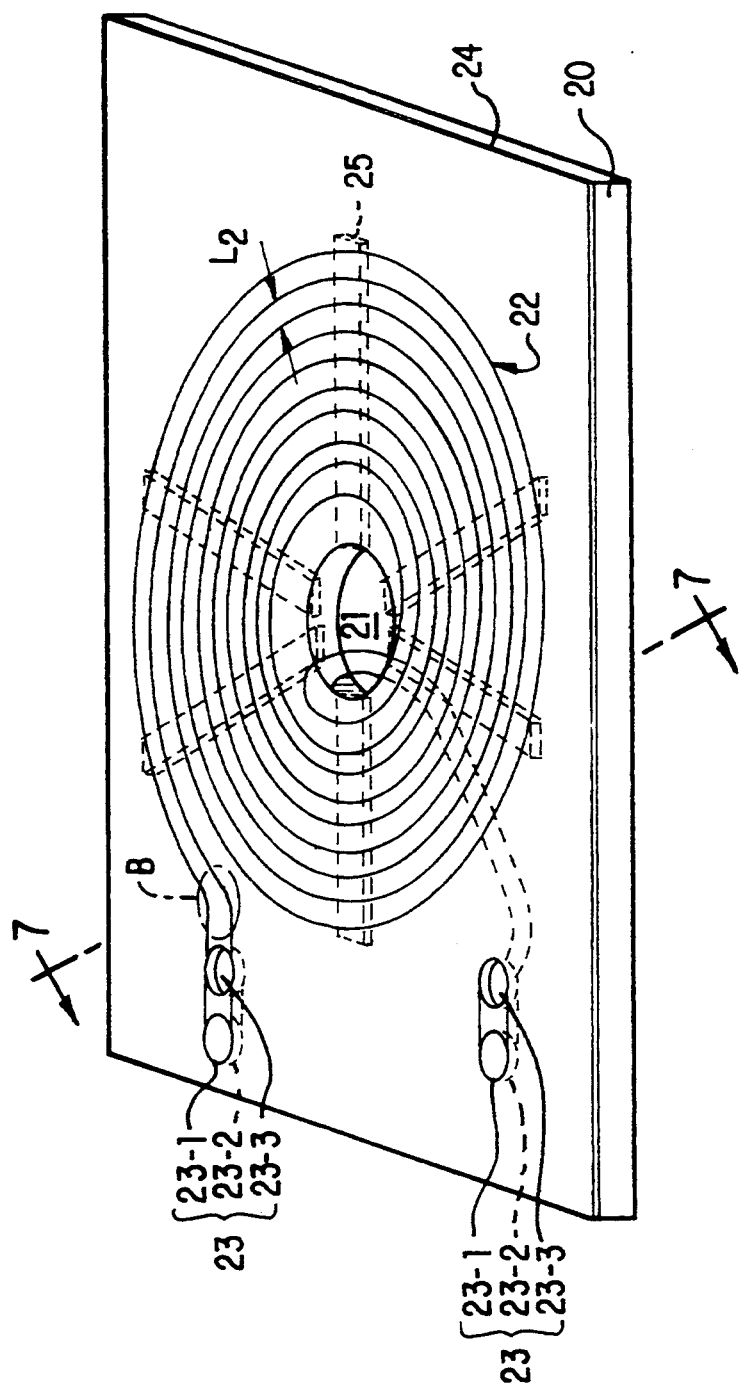
FIG. 5 is a perspective view of a heating apparatus for an electromagnetic cooker according to an embodiment of the present invention.

Referring to FIG. 5, there is illustrated a heating apparatus for an electromagnetic cooker according to an embodiment of the present invention, which comprises a substrate 20 having a passing hole 21 at the central portion.

The substrate 20 comprises a copper coated line group 22 formed in a spiral shape, from the left upper portion of the upper surface to the passing hole 21. The copper coated line group 22 is extended to the left lower portion of the lower surface of the substrate 20 through the side of the passing hole 21. A pair of power source terminals 23 are formed on the both ends of the copper coated line group 22, so as to receive a driving power source. The power source terminals 23 comprise a pair of copper coated plates 23-1 and 23-2 formed on the opposite surfaces, respectively to the upper and lower surfaces, and a solder mask 23-3 for connecting the copper coated plates 23-1 and 23-2. The solder mask 23-3 is connected to the both copper coated plates 23-1 and 23-2 by passing through the substrate 20. The substrate 20 is made of an electrically insulating material. The copper coated line group 22 has an electrical resistivity below $3.0 \times 10^{-8} \Omega.m$. And, the copper coated line group 22 can be replaced with another conductive material, for instance, aluminum alloy, having an electrical resistivity below $3.0 \times 10^{-8} \Omega.m$. The copper coated plates 23-1 and 23-2 of the power source terminals 23 and the copper coated line group 22 are formed by the following processes. First of all, a copper film is coated on the upper and lower surfaces of the substrate 20 with a predetermined thickness and then a photoresist is laminated. Then, after a plurality of photoresist stripes for line group in the form of spiral and the photoresist plates for power source terminals are patterned on the copper coated surface by exposing, and developing, the power source terminals 23 and the copper coated line group 22 are formed by selectively removing the photoresist-uncoated copper film areas by an etching solution.

The heating apparatus additionally comprises an enamel layer 24 coated on the copper coated line group 22 formed on the upper surface of the substrate 20, and a plurality of ferrites cores 25 arranged radially with predetermined angles therebetween on the lower surface of the substrate 20. The ferrites cores 25 provide a passage for magnetic field.

Figure 6:
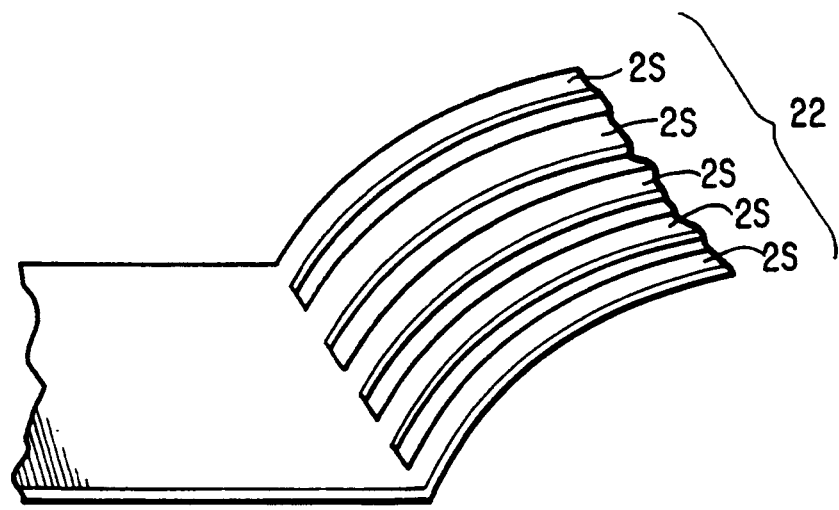
FIG. 6 is an enlarged view of portion B shown in FIG. 5.
Figure 7:
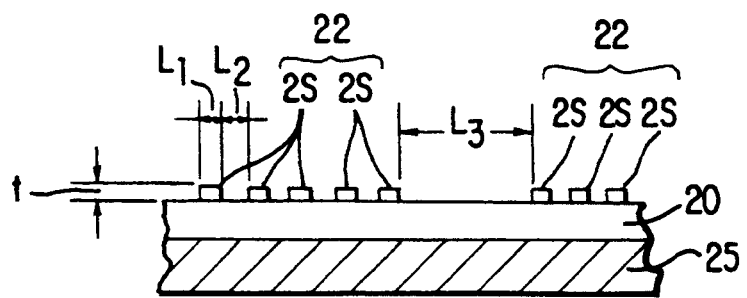
FIG. 7 is a cutaway sectional view taken on the line A-A' of portion B shown in FIG. 5.

FIG. 6 illustrates an enlarged view of the connecting portion B between the copper coated line group 22 and the power source terminal 23. FIG. 7 is a partially cutaway sectional view taken on the line A-A' of the connecting portion B between the copper coated line group 22 and the power source terminal 23, shown in FIG. 5. In FIGS. 6 and 7, the copper coated line group 22 comprises a plurality of parallelly spaced copper coated fine lines 25. The copper coated fine lines 25 23 have a predetermined thickness t and a predetermined width $L_1$ with a predetermined distance therebetween $L_2$, while an adjacent pair of groups 22 of the copper coated fine lines are separated by a predetermined width $L_3$. All of the copper coated fine lines 25 are connected to the power source terminal 23.

Figure 1:
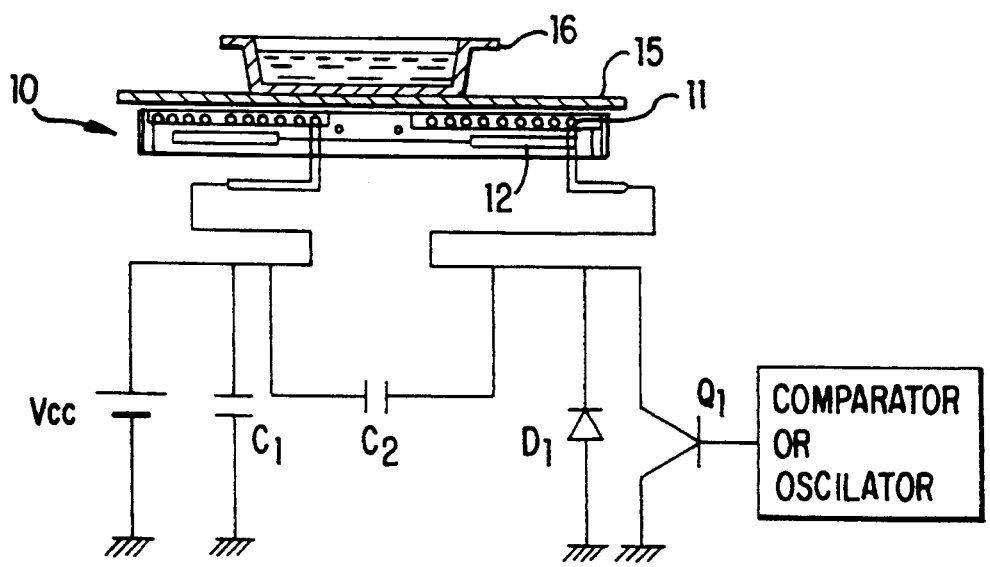
FIG. 1 is a schematic constitution diagram of a conventional electromagnetic cooker.
Figure 4:
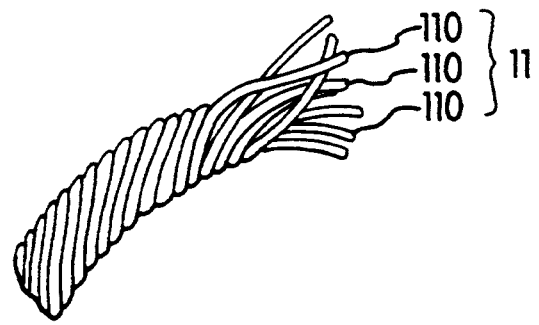
FIG. 4 is a partially detailed view of the working coil illustrated in FIG. 2.
Figure 3:
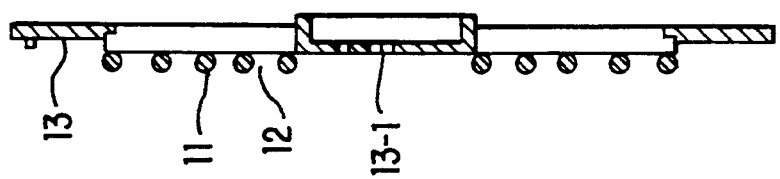
FIGS. 2 and 3 are a plan view and a sectional side view, respectiely, of the heating apparatus shown in FIG. 1.
Figure 2:
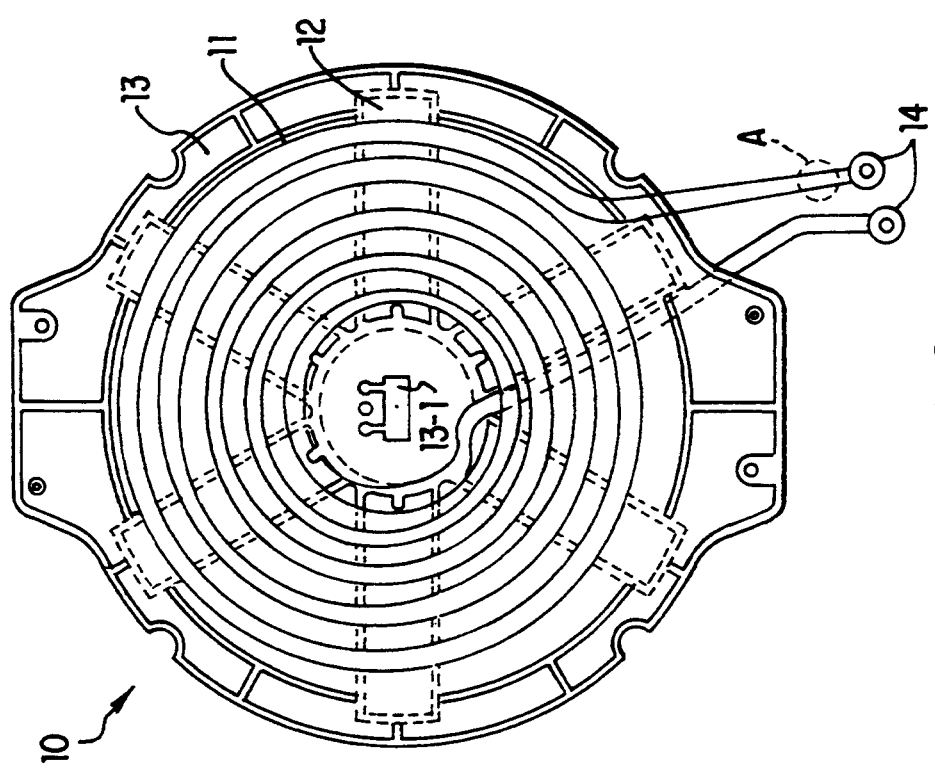

As described above, the heating apparatus for an electromagnetic cooker is installed below the ceramic plate where a metallic container is disposed, contrary to the conventional heating apparatus shown in FIG. 1. In the present invention, the copper coated line group 22 supplies to the metallic container a high frequency AC magnetic field which is generated by an alternating current supplied according to the switching of the transistor $Q_1$, thereby inducing an eddy current in the metallic container, which heats the food in the container. In the present invention the frequency of the switching pulse signal supplied to the transistor $Q_1$ is about 100 KHz, since the electrical resistivity of the copper coated line group 22 is as small as $3.0 \times 10^{-8}.m$.

Figure 8:
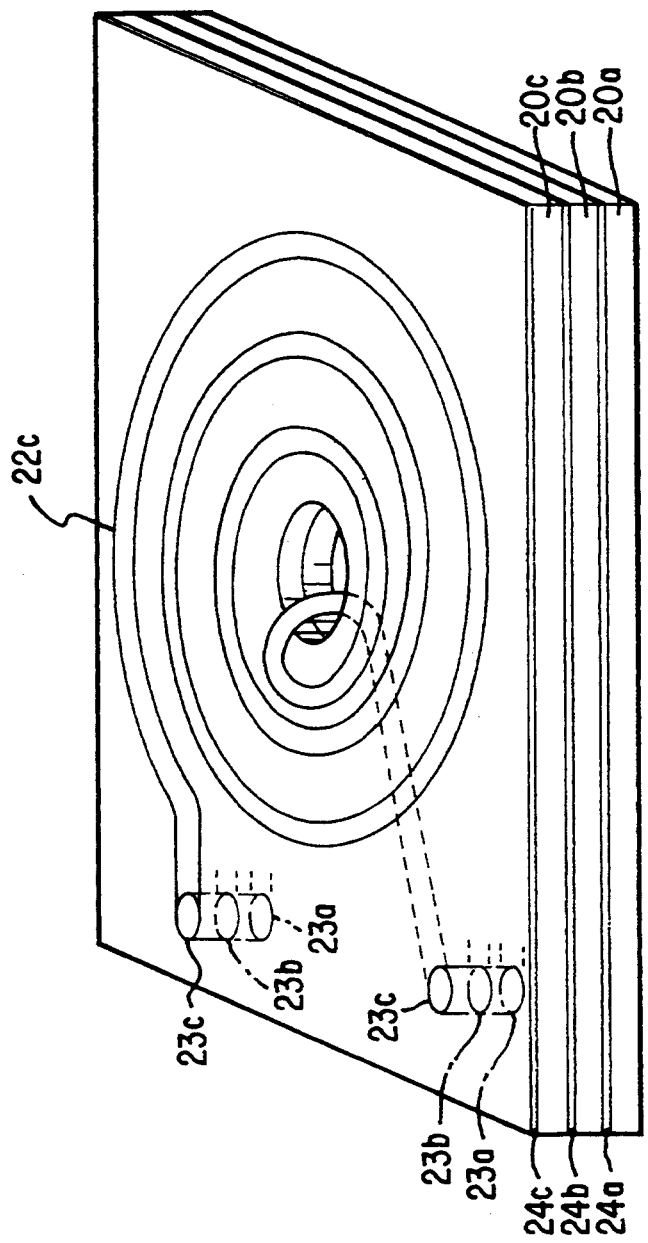
FIG. 8 is a perspective view of a heating apparatus for an electromagnetic cooker according to another embodiment of the present invention.

With reference to FIG. 8, a heating apparatus for an electromagnetic cooker according to another embodiment of the present invention comprises a plurality of substrates 20a, 20b and 20c, a plurality of layers of spiral copper coated line groups 22a, 22b and 22c, including power source terminals 23a, 23b and 23c for supplying the operational power source thereto are formed onto the upper surfaces of the substrates, with one spiral copper coated line group on each of the upper surfaces of the substrates, and enamel layers 24a, 24b and 24c are formed on the spiral copper coated line groups. The substrates with the spiral copper coated line groups and the enamel layers are laminated or stacked over each other as shown in FIG. 8. The reason for the lamination is to increase or improve the generation efficiency of the high frequency AC magnetic field by varying the inductance by increasing the number of copper coated fine lines. Moreover, when the number of copper coated fine lines constituting the copper coasted line group 22 formed on one substrate cannot be further increased because of the stability in insulation, the lamination thereof provides means for increasing the number of copper coated fine lines to vary the inductance. The pairs of power source terminals 23a, 23b and 23c formed on the respective substrates pass through the substrates and form a pair of group power source terminals by a solder mask process. The group power source terminals are electrically connected to the ends of the copper coated line group formed on each substrate.

The heating apparatus for an electromagnetic cooker additionally comprises ferrite cores 25 installed on the lower surface of the lower substrate 20a among the multi-layer laminated substrates 20a, 20b, and 20c. The ferrite cores 25 are arranged radially with predetermined angles therebetween.

As described above, in the heating apparatus of the present invention, a plurality of copper coated fine lines formed in the spiral shape and having the uniform thickness and width are formed, so that there is an advantage in that the magnetic field can be uniformly generated. The heating apparatus of the present invention laminates the standardized substrates where the plurality of copper coated fine lines formed in the spiral shape and having the uniform thickness and width, thereby having an advantage in that the change of the inductance is easier than that of the conventional heating apparatus.

Also, the method of manufacturing the heating apparatus of the present invention has an advantage of reducing the cost, while the conventional method of manufacturing a heating apparatus re-manufactures the mounting base according to the winding distribution of the working coil.

What is claimed is:

1. An inductor arrangement for an induction heating apparatus comprising:
    a substrate made of an insulating material;
    a copper coated line group formed on said substrate,
        wherein said copper coated line group forms a spiral and comprises a plurality of parallelly spaced copper coated fine lines;

a pair of power source terminals formed on both ends of said copper coated line group, wherein all of one ends of said copper coated fine lines are connected to one of said pair of power source terminals and all of the other ends of said copper coated fine lines are connected to other of said pair of power source terminals.

2. An inductor arrangement as claimed in claim 1, wherein said copper coated fine lines are made of conductive material having an electrical resistivity of $3.0 \times 10^{-8}$ $\Omega$.m.

3. An inductor arrangement as claimed in claim 2, wherein said copper coated fine lines are formed of a copper.

4. An inductor arrangement as claimed in claim 1, further comprising a predetermined number of ferrite cores of a predetermined shape formed on the lower surface of said substrate so as to form a passage for magnetic field.

5. An inductor arrangement as claimed in claim 1, wherein said substrate is a printed circuit board and said copper coated fine lines are formed on said circuit board by patterning and etching said printed circuit board.

6. An inductor arrangement for an induction heating apparatus comprising:

at least two laminated substrates made of an insulating material;

a copper coated line group formed on each of said substrates, wherein each of said conductor line groups forms a spiral and comprises a plurality of parallelly spaced copper coated fine lines;

a pair of power source terminals formed on both ends of each said copper coated line group, wherein all of one ends of said copper coated fine lines of each said copper coated line group are connected to one of said pair of power source terminals and all of the other ends of said copper coated fine lines of each said copper coated line group are connected to the other of said pair of power source terminals.

7. An inductor arrangement as claimed in claim 6, further comprising a predetermined number of ferrite cores of a predetermined shape formed on the side opposite where said copper coated line group is formed on the lowest substrate among said at least two laminated substrates, for forming a magnetic field passage.

8. An inductor arrangement as claimed in claim 6, wherein each of said substrates is a printed circuit board and said fine lines formed on each of said substrates are formed by patterning and etching said printed circuit board.

9. An inductor arrangement as claimed in claim 6, further comprising an insulating layer formed over said fine lines.

10. An inductor arrangement as claimed in claim 9, wherein said insulating layer comprises an enamel.

11. An inductor arrangement as claimed in claim 10, wherein said power source terminals for each said copper coated line group are connected in parallel to each other.

* * * * *